United States Patent [19]
Yamashita et al.

[11] 3,820,106
[45] June 25, 1974

[54] SIGNAL TRANSMISSION LINE FOR AUTOMATIC GAUGE INSPECTION SYSTEM

[75] Inventors: Hiroshi Yamashita, Minoo; Michihiro Ishizaka, Amagasaki, both of Japan

[73] Assignee: Mitsubishi Denki Kabushiki Kaisha, Chuyoda-Ku, Japan

[22] Filed: May 17, 1971

[21] Appl. No.: 144,163

[30] Foreign Application Priority Data
May 20, 1970 Japan .......................... 45/43570
July 9, 1970 Japan .......................... 45/60104

[52] U.S. Cl. ............. 340/310 A, 340/151, 174/70 A
[51] Int. Cl. ......................................... H04m 11/04
[58] Field of Search .......... 340/310, 151; 175/17 R, 175/70 A

[56] References Cited
UNITED STATES PATENTS

| | | | |
|---|---|---|---|
| 2,295,442 | 9/1942 | Wilhelm | 340/310 |
| 2,581,056 | 1/1952 | Walmsley et al. | 340/310 |
| 2,860,324 | 11/1958 | Berger et al. | 340/310 |
| 3,164,771 | 1/1965 | Milford | 340/151 |
| 3,297,814 | 1/1967 | McClean et al. | 174/70 A |
| 3,328,510 | 6/1967 | White | 174/117 R |
| 3,445,814 | 5/1969 | Spalti | 340/151 |

*Primary Examiner*—Thomas B. Habecker
*Attorney, Agent, or Firm*—Robert E. Burns; Emmanuel J. Lobato; Bruce L. Adams

[57] ABSTRACT

Metering devices such as utility meters include series resonant circuits connected in parallel to a common transmission line through indicating means comprising normally open contacts. Each time the meter integrates one unit of power, its contacts are closed for a predetermined time. A sampling means in a repeater successively delivers to the line different frequencies assigned to each of the circuits. If one of the resonant circuits receives its own frequency during the closure of its contacts, a decrease in line impedance is sensed by the repeater and its associated memory means such as a register counts "ONE". The transmission line includes a neutral conductor of a three-phase three-wire distribution system and a covered signal transmission conductor juxtaposed in an electrically insulated relationship by an insulation.

5 Claims, 7 Drawing Figures

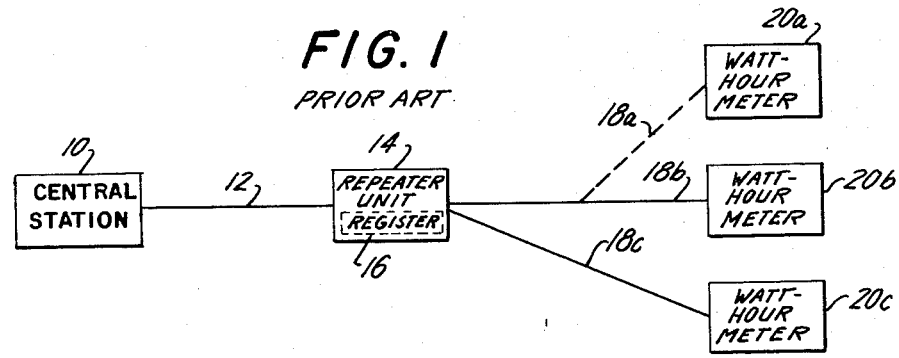
FIG. 1
PRIOR ART
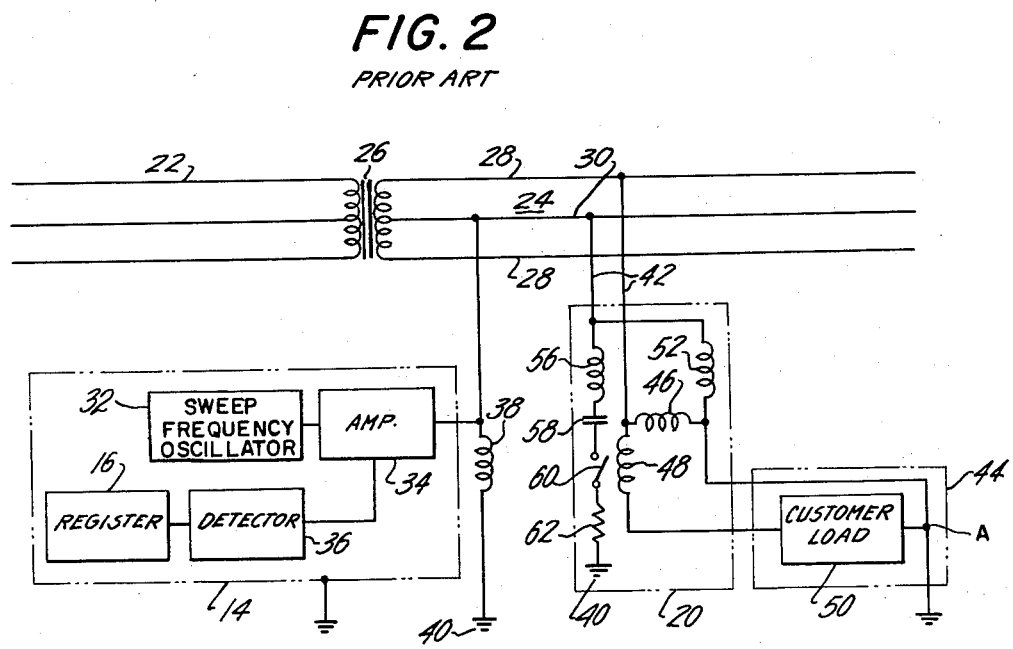
FIG. 2
PRIOR ART
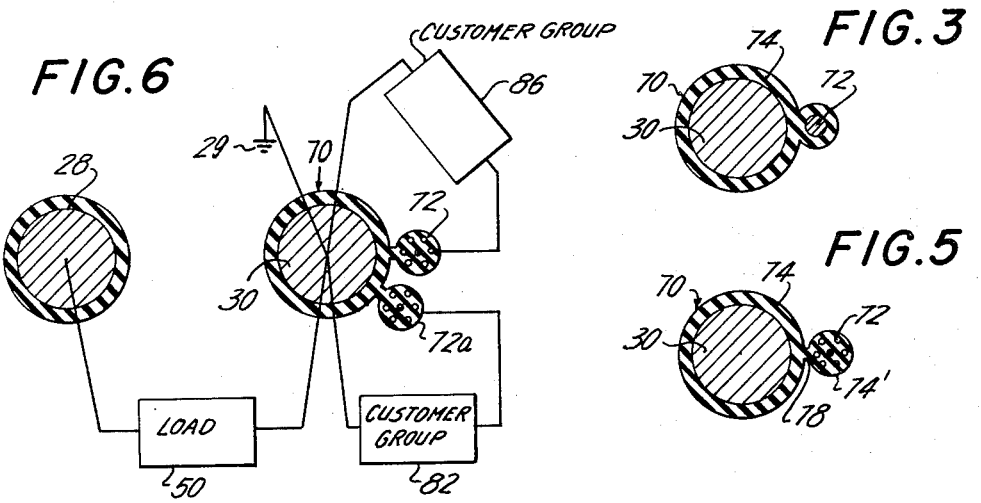
FIG. 3
FIG. 6
FIG. 5

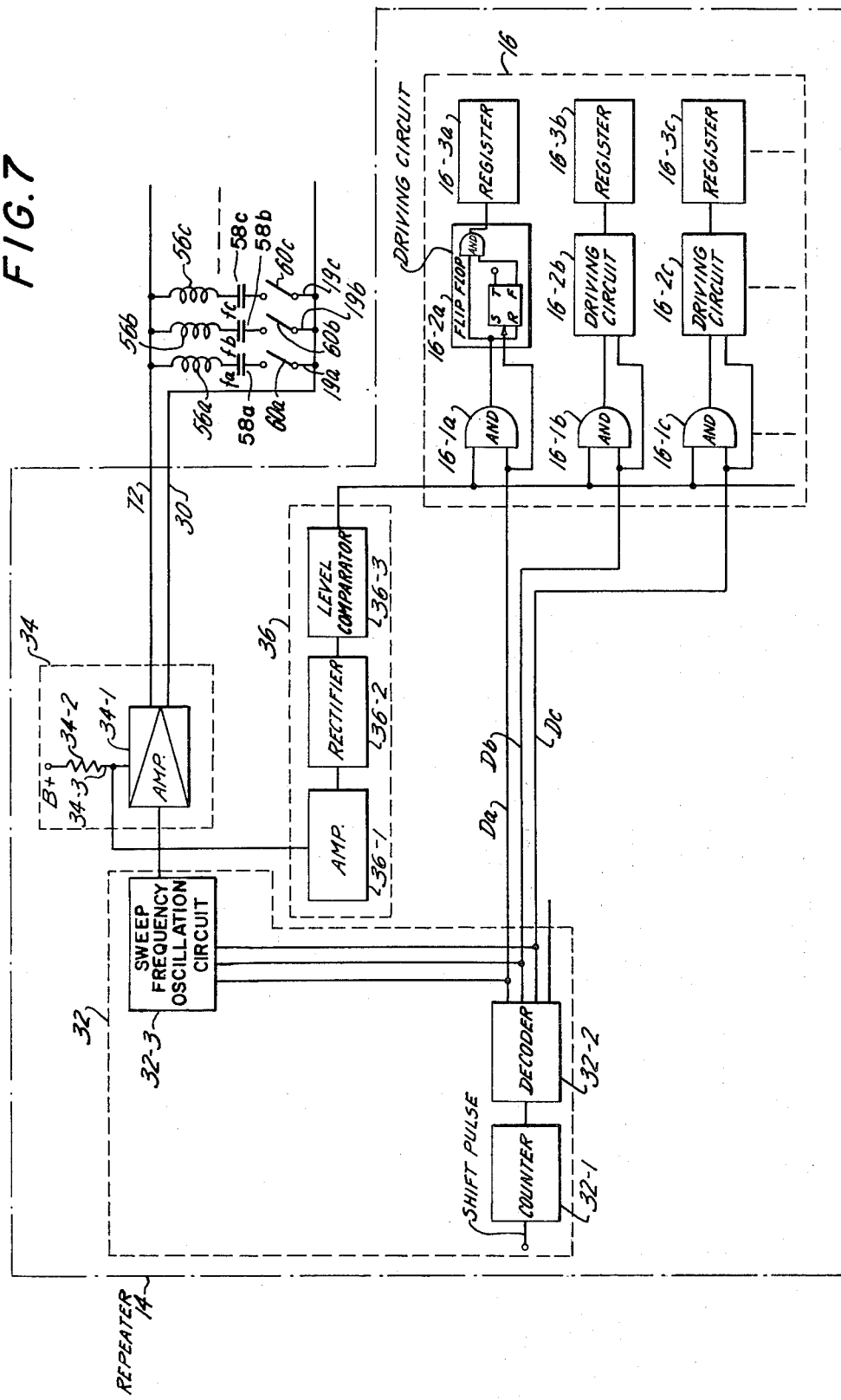

_3,820,106_

SIGNAL TRANSMISSION LINE FOR AUTOMATIC GAUGE INSPECTION SYSTEM

BACKGROUND OF THE INVENTION

This invention relates to a signal transmission line for use with an automatic gauge inspection system, and more particularly to such a transmission line using either a neutral or a grounded conductor of a power distribution line and a signal transmission conductor disposed separately from the distribution line.

Automatic gauge inspection systems for an electric utility not relying upon the commercial telephone system includes a combined memory means and sampling means for separately registering outputs from a plurality of metering devices including indicating means, each disposed for a different customer and a measuring line for connecting a register and repeater unit to the watt-hour meters. The measuring line is the most significant problem encountered in such automatic gauge inspection systems and has been previously sorted into two types, one of which utilizes the pilot wire and the other of which utilizes the existing low-voltage distribution line.

In the type utilizing the pilot wire, lengths of two core measuring wire have been laid on an individual service conductor for customers to connect the combined register and repeater unit to all watt-hour meters disposed for the customers. Pulses provided by the watt-hour meters are transmitted through the individual lengths of measuring wire to the register and repeater unit to cause quantities of power consumed by the customers to be separately registered, every moment, on the respective registers involved. Thereafter the unit can deliver the contents of the registers in response to a command from the central station. The pilot wire type just described has been most disadvantageous in that a multiplicity of measuring lines, one for each watt-hour meter, are required to be disposed between the combined register and repeater unti and all the associated watt-hour meters. Therefore the laying work for this system has greatly consumed time and labor.

In comparison, the type utilizing the low-voltage distribution line is not required to be provided with separate measuring lines but it has encountered a multiplicity of technical problems in that the measuring line includes a multiplicity of branches leading to individual customers.

SUMMARY OF THE INVENTION

Accordingly, it is a principal object of the invention to provide a new and improved signal transmission line for use with an automatic gauge inspection system capable of delivering and picking up signals for measurment to and from the transmission line in a manner that is convenient and particularly suitable for practical use.

It is another object of the invention to provide a new and improved signal transmission line for use with an automatic gauge inspection system that is simple and convenient in laying work of cable.

It is still another object of the invention to provide a new and improved signal transmison line for use with an automatic gauge inspection system capable of increasing the number of customers for which the measurement can be effected.

The invention accomplishes these objects by the provision of a signal transmission line for use with an automatic gauge inspection system comprising a plurality of metering devices such as integration meters connected across a power conductor and one selected neutral and or a ground conductor of a power distribution line to an indicating means which produces one signal for each predetermined fixed increment of a quantity integrated thereby, and a sampling means in a repeater unit including means for separatley registering the quantities integrated respectively by the plurality of integration meters, the repeater unit being connected to the plurality of integration meters through the signal transmission line, characterized in that the signal transmission line includes the selected neutral or ground conductor of the power distribution line and a signal transmission conductor juxtaposed in an electrically insulated relationship with the selected conductor, the signals from each of the integration meters being delivered to the signal transmission conductor and returned back to that integration meter through the repeater unit.

In a preferred embodiment of the invention the one selected neutral grounding conductor and the signal transmission conductor may be covered in an electrically insulated relationship and made into a unitary structure by an electrical insulation to form a length of compound electric wire.

In order to facilitate the cable laying work, the signal transmission conductor may be a stranded conductor disposed in a juxtaposed electrically insulated relationship with the selected conductor in an electrical insulation having a constricted portion formed between both the conductors.

BRIEF DESCRIPTION OF THE DRAWINGS

The invention will become more readily apparent from the following detailed description taken in conjunction with the accompanying drawings in which:

FIG. 1 is a block diagram of an automatic guage inspection system with which the invention is concerned;

FIG. 2 is a schematic circuit diagram of an automatic gauge inspection system for watt-hour meters utilizing a low-voltage distribution line in accordance with the principles of the prior art;

FIG. 3 is a cross sectional view of a measuring wire constructed in accordance with the principles of the invention for use with an automatic gauge inspection system;

FIG. 5 is a cross section view of a modification of the invention;

FIG. 6 is a cross section view of another modification of the invention with the associated components illustrated in blocks; and FIG. 7 is a combined block and circuit diagram illustrating in more detail the essential part of the arrangement shown in FIG. 4.

DESCRIPTION OF THE PREFERRED EMBODIMENTS

Figure 4:
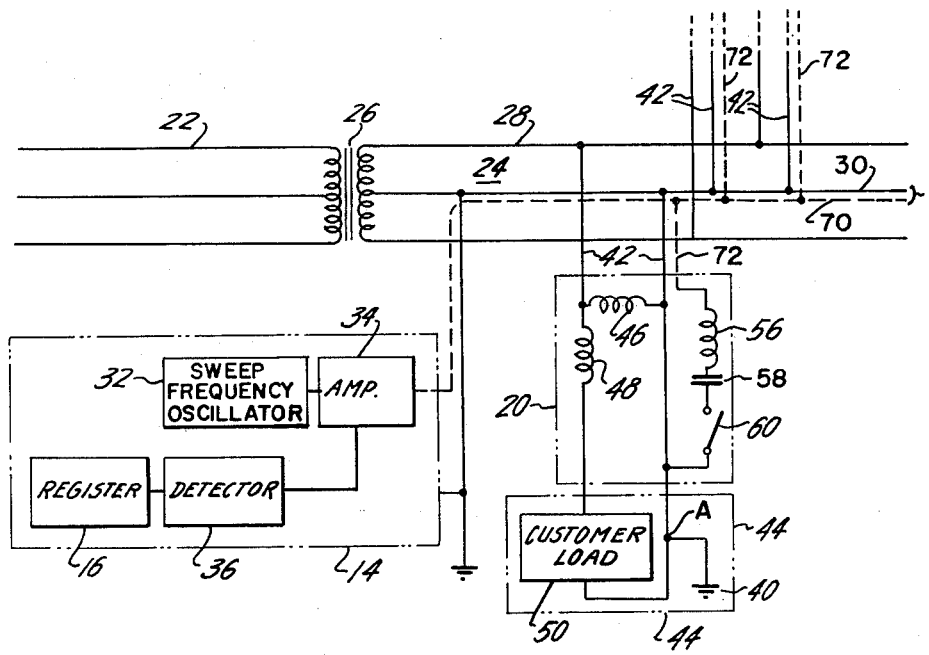
FIG. 4 is a schematic circuit diagram of an automatic gauge inspection system embodying the principle of the invention.

Referring now to the drawings and FIG. 1 in particular, it is seen that an arrangement disclosed herein comprises a central station 10 comprising an interrogation means, a repeater unit 14 connected to a central station 10 through a repeating line 12, disposed adjacent a pole transformer or the like (not shown) and including a plurality of memory means such as registers (only one of which is illustrated at dotted rectangle 16), and a plurality of watt-hour meters 20a, b, c each disposed for a different customer and connected to the repeater unit 14 through a measuring network 18. While a single repeater unit 14 is illustrated, it is to be understood that a plurality of such repeater units may be connected to a common central station through individual repeating lines and each of the repeater units connected to a plurality of watt-hour meters located in its own service area. The measuring network 18 is shown in FIG. 1 as including a plurality of measuring lines 18a, b and c, connecting the repeater unit 14 to different watt-hour meters 20a, b and c respectively. Each register 16 in the repeater unit 14 is operatively coupled to a different watt-hour meter.

The watt-hour meter 20 includes its own resonant circuit and a set of normally open contacts although they are not shown in FIG. 1. The contacts are adapted to be closed each time the watt-hour meter has integrated a predetermined fixed increment of electric power consumed by its associated customer and to be open before the meter will have integrated the subsequent increment of consumed power. For example, the contacts may be closed each time the watt-hour meter has integrated one unit, such as 1 kilowatt of consumed power, and maintained in their closed position for a predetermined fixed time interval. Thereafter the closed contacts are put in their open position before the watt-hour meter will have integrated the subsequent unit of consumed power. The closure of the contacts is signalled to the repeater unit 14 to count ONE on the associated register 16. The subsequent closure of the contacts repeats the process as described above to count ONE again on the register 16. In this way, the quantities of power consumed by customers are separately registered on their associated registers.

The repeater unit 14 is adapted to respond to an interrogation from the central station 10 to deliver thereto the content of that register 16 selected by the interrogation through the repeating line 12.

Therefore the central station 10 can collect the information regarding the quantities of electric power consumed by all the customers in the geographic area assigned thereto.

Referring now to FIG. 2, an automatic gauge inspection system utilizing the power distribution line of a three-phase three-wire system in accordance with the principles of the prior art is illustrated. The system is shown in greater detail in FIG. 2 as including a signal transmission line consisting of the neutral conductor of the distribution line and the ground serving as a return conductor.

The arrangement illustrated comprises a high voltage distribution line 22, a low voltage distribution line 24 and a pole transformer 26 electrically connecting the high voltage line 22 to the low voltage line 24. The low voltage line 24 includes a pair of low voltage conductors 28 operated with a low voltage of 100 to 200 volts and a neutral or grounded conductor 30. A repeater unit 14 such as the one described above in conjunction with FIG. 1 includes a sweep frequency oscillator 32 connected to the neutral conductor 30 through an amplifier 34 and a register 16 connected to the amplifier 34 through a detector 36. The junction of the neutral conductor 30 and the amplifier 34 is connected through a choking coil 38 to ground 40.

One of the low voltage conductors 28 in the example illustrated, the upper conductor 28 as viewed in FIG. 2, and the neutral conductor 30 extend by service conductors 42 to one customer designated at the dot-and-dash block 44 through a watt-hour meter 20 such as described above in conjunction with FIG. 1. The watt-hour meter 20 is shown in FIG. 2 as including a potential coil 46 connected at one end to that service conductor 42 which is connected to the upper voltage conductor 28 and a current coil 48 disposed on the same service conductor. Then, both coils 46 and 48 are connected acrosa a load 50 disposed for the customer 44. The potential coil 46 has its other end connected to the neutral conductor 30 through a signal blocking coil 52 which will be described later. The watt-hour meter 20 further comprises a series resonant circuit including an inductor 56, a capacitor 58, a set of normally open relay contacts 60 and a resistance 62 connected in a series circuit relationshiip between the netural conductor 30 through the associated service conductor 42 and the ground 40. It is assumed that the inductor 56, and the capacitor 58 have an inductance L and a capacitance C respectively. The resistance 42 has a magnitude R equivalent to the sum of the resistance of the inductor 56 and the grounded resistance of the ground 40.

While the single customer and the associated watt-hour meter are illustrated in FIG. 2 it is to be understood that a plurality of customers and their watt-hour meters are connected in a parallel circuit relationship across the upper or lower voltage conductor 28 and the netural conductor 30 through individual pairs of service conductors.

The arrangement as shown in FIG. 2 is operated on the basis of the detection of a change in impedance at a given frequency associated with the watt-hour meters 20. To this end, different frequencies $f_a, f_b, f_c, \ldots$ are preliminarily assigned to the different watt-hour meters. For example, the watt-hour meter 20 as shown in FIG. 2 has assigned thereto the frequency $f_a$ at which the series resonant circuit 56–58 is adapted to resonate. The closure of the relay contacts 60 in response to one unit of power integrated by the watt-hour meter 20 is detected through the scanning of all the contacts with the frequencies delivered from the repeater unit 14. More specifically, the closure of the contacts 60 permits the series resonant circuit 56–58 to be connected across the neutral conductor 30 and ground 40. As described above, the series resonant circuit can resonate at the frequency $f_a$.

In addition, the sweep frequency oscillator 32 disposed in the repeater unit 14 is adapted to successively produce different sweep frequencies $f_a, f_b, f_c, \ldots$ for scanning purposes. Those frequencies are delivered to the neutral conductor 30 through the amplifier 34. It is noted here that the choking coil 38, connected between the amplifier 34 or the netural conductor 30 and ground 40, serves to ground the netural conductor 30 for the commercial power frequency but to electrically isolate the latter from the ground 40 at the scanning frequencies $f_a, f_b, f_c, \ldots$.

If the oscillator 32 delivers the scanning frequency $f_a$ to the netural conductor 30 while the contacts 60 of the watt-hour meter 20 is in its closed position, the series resonant circuit 56–58 is put in series resonance decreasing the impedance of the netural conductor 30 relative to the ground 40 at the frequency $f_a$. This decrease in impedance of the neutral conductor 30 is detected by the detector 36 through the amplifier 34 to cause the associated register 16 to count ONE. The register 16 is designed and constructed such that after it has counted ONE in respone to the closure of the meter's contact 60, it is prevented from additionally counting ONE before the contacts 60 are again closed after the subsequent opening thereof. In other words, the register counts ONE Only in response to a single closure of the contacts 60 even though the same scanning frequency would be produced many times during that closure of the contacts. The register 16 repeats the process as above described in response to each closure of the contacts 60 to register the information regarding the quantity of power consumed every hour by the customer 44.

For different customers, the associated registers cooperate with different scanning frequencies that are assigned to the respective customers to register the information regarding their individual quantities of consumed power in the same manner as above described.

The arrangement as illustrated in FIG. 2 has been disadvantageous if the customer has forced to ground the internal circuit at a point A such that the neutral conductor 30 exhibits an extremely low impedance to ground over the entire range of scanning frequencies. This makes it impossible not only to effect the scanning by the repeater unit 14 but also to easily locate the grounded point A.

To eliminate those objections, one might insert the blocking coil 52 to the netural conductor 42 at a service entrance for each customer. In order to avoid the effect of grounding at the point A, it is required that the blocking coil 52 have a considerably high inductance and a current capacity of 30 to 50 amperes over a frequency band of 1 to 60 kilohertz so that it can be generally used with the automatic gauge inspection system. This is difficult to be economically realized. For example, with the blocking coil 52 having an inductance of 100 microhenries, the blocking coil 52 will have an impedance of about 0.6 ohms for a sweep frequency of 1 kilohertz. The value of the impedance of the coil 52 is more than one order of magnitude less than the equivalent grounding resistance 62. Usually, the equivalent resistance R is equal to or more than about 20 ohms. Therefore the insertion of the blocking coil 52 scarcely has the desired effect upon the system.

In the arrangement of FIG. 2, it is also necessary to ground the individual series resonant circuits at one end such as shown at 40 for each customer. However the grounding may not be easily effected and the grounding conductor may be broken leading to the impossibility of inspecting the associated watt-hour meter.

The present invention contemplates to eliminate the disadvantages of the prior art practice as described above.

FIG. 3 shows in cross section a measuring wire constructed in accordance with the principles of the invention for use with an automatic guage inspection system such as illustrated in FIG. 2. The wire generally designated by the reference numeral 70 includes a conductor equivalent to the netural conductor 30, as shown in FIG. 2 and therefore designated by the same reference numeral 30 as the latter, and a signal transmission conductor 72 juxtaposed to the conductor 30 with an electrically insulating sheath 74 encircling both the conductors 30 and 72 together in an electrically insulated relationship.

Referring now to FIG. 4 wherein like reference numerals designate the components identical or similar to those shown in FIG. 2, an automatic gauge inspection system including the measuring wire 70 as shown in FIG. 2 is illustrated. By comparing FIG. 4 with FIG. 2 it is seen that in FIG. 4, the measuring wire 70 is substituted for the neutral conductor 30 as described above in conjunction with FIG. 2 and the blocking coil is omitted. More specifically, the measuring wire 70 has the conductor 30 connected to ground adjacent to the pole transformer 26 and the repeater unit 14 and the signal transmission conductor 72 connected at one end to the amplifier 34 of the repeater unit 14. The conductor 30 serving as the neutral conductor 30 as shown in FIG. 2 and the signal transmission conductor 72 are branched to each of the customers through the respective pair of service conductors 42 and a service transmission branch 76. For each customer the service conductor 42 leading to the conductor 30 is directly connected to the ground 40 and the transmission conductor is directly connected to the series resonant circuit 56–58 in the watt-hour meter 20. In other respects the arrangement is identical to that shown in FIG. 2.

In the arrangement of FIG. 2, the repeater unit 14 delivers the frequency signals from the oscillator 32 through the amplifier 34 to the signal transmission conductor 72 but not to the neutral conductor 30 which is electrically floating with respect to ground by the choking coil as shown in FIG. 2. Then signals are supplied to the customer and returned back to the repeater unit 14 through the neutral conductor 30. For example, if the repeater unit 14 delivers the signal having the frequency $f_a$ to the transmission conductor 72 and therefore to the customers, while for the illustrated customer the contacts 60 are in their closed position as a result of the watt-hour meter 20 having integrated one unit of consumed power, then the associated series resonant circuit 56–58 preset to resonate at the frequency $f_a$ presents an extremely low impedance before the transmitted signal. Therefore the amplifier 34 acknowledges the increase in consumed power at that frequency $f_a$ which is detected by the detector 36, resulting in an incremental quantity of consumed power or ONE being counted by the register 16 operatively associated with the frequency $f_a$. Similarly if a second watt-hour meter disposed for a second customer has contacts such as the contacts 60 in their closed position when its associated series resonant circuit, having resonant frequency $f_b$, receives another signal with the frequency $f_b$ the register operatively associated with that frequency $f_b$ will additionally count ONE.

As the individual customers are identified with their frequencies $f_a, f_b, \ldots$ that were preliminarily assigned thereto, the repeater unit 14 can determine the status of the contacts connected in the watt-hour meter disposed for each customer through the utilization of the sweep frequencies supplied to the watt-hour meters by means of the measuring wire 70 and the service conductors and branches 42.

While the service conductor 42 connected to the netural or core conductor 30 is shown in FIG. 4 as being grounded at point 40 in each customer's location it is to be understood that the service conductor 42 may remain ungrounded, if desired.

In order to aid in a better understanding of the invention, the repeater unit 14 will now be described in more detail. The repeater unit may be of the conventional construction such as shown in FIG. 7 wherein like reference numerals designate the components identical to those shown in FIG. 4. The conductors 72 and 30 forming the signal transmission line have a plurality of series resonant circuits 56–58 connected in a parallel circuit relationship therebetween through the associated contacts 60 in their open position. The resonant circuits have different resonance frequencies, $f_a, f_b, f_c \ldots$ respectively, as described above.

Furthermore, the oscillator 32 included in the repeater unit is shown in FIG. 7 as including a counter 32-1, a decoder 32-2 and an oscillation circuit 32-3 connected in a series circuit relationship respectively. The oscillation circuit 32-3 is preferably a collector tuned LC type sweep frequency oscillator. The counter 32-1 has shift pulses successively applied thereto at predetermined equal time intervals, for example 5 seconds, and can count the pulses at least equal to the number of customers located in the area assigned to the repeater unit, to produce a binary signal in accordance with the particular count thereon. After having counted all the pulses, the counter 32-1 is cleared and begins to count the pulses again. The binary signals from the counter 32-1 are successively applied to the decoder 32-2 which, in turn, switches its output D$a$, D$b$, D$c$, ... in succession so that only one of the outputs D$a$, D$b$, D$c$, ... always produces an output signal in response to the applied binary signal. In the example illustrated, the outputs D$a$, D$b$, D$c$, ... of the decoder 32-2 are switched at a rate corresponding to the time period of 5 seconds, although the time period may changed if desired.

The oscillation circuit 32-3 responds to the particular output signal from the decoder 32-2 to apply to the amplifier 34 that frequency as determined by the said output signal. The amplifier 34 is shown in FIG. 7 as including an amplifying circuit 34-1 connected to the oscillation circuit 32-3 and supplied with an electric power through a terminal B+ and a resistor 34-2 with the junction 34-3 of the amplifying circuit 34-1 and the resistor 34-2 connected to the detector 36. The amplifying circuit 34-1 may includes preferably an automatic gain control (not shown). Thus it will be appreciated that the amplifier 34 delivers the different frequencies $f_a, f_b, f_c, \ldots$ one after another at predetermined equal time intervals, in this case of 5 seconds, thereby to scan the status of the customers' contacts 60$a$, 60$b$, 60$c$, ...

It is now assumed that the oscillation circuit 32-3 is sending a selected one of the frequencies $f_a, f_b, f_c, \ldots$ to the conductors 72 and 30 through the amplifying circuit 34-1. Under the assumed condition, if that watt-hour meter (not shown), including the series resonant circuit resonating at the selected frequency, has its contacts in the closed position, then that series resonant circuit exhibits an extremely low impedance at the selected frequency thus decreasing the output impedance of the amplifying circuit 34-1 to an extremely low magnitude. For example, if the contacts 60$a$ are in their closed position for the frequency $f_a$, the amplifying circuit 34-1 becomes very low in output impedance. On the contrary, if the contacts 60$a$ are in their open position the circuit 34-1 has an output impedance far higher than that obtained with the contacts 60$a$ maintained in their closed position. Therefore an electric power consumed by the amplifying circuit 34-1 varies in accordance with whether the contacts are closed or open. This causes a variation in potential at the junction 34-3 which is, in turn, supplied to the detector 36.

In FIG. 7, the detector 36 is shown as including an amplifier 36-1, a rectifier 36-2 and a level comparator 36-3 serially connected in the named order. A signal representative of a variation in potential at the junction 34-3 is amplified by the amplifier 36-1, rectified by the rectifier 36-2 and compared with a reference by the level comparator 36-3. If the input to the detector 36 of the amplifier 36-1 indicates the closure of the associated customer's contacts 60, in this case the contacts 60$a$, as determined by the level comparator 36-3, then the latter produces an output signal which is applied to the register 16.

The register 16 is shown in FIG. 7 as including one series combination of an AND circuit 16-1, a driving circuit 16-2 and a register circuit 16-3 for each customer or each set of contacts 60 with all the series combinations connected in parallel circuit relationship with the level comparator 36-3. All the driving circuits 16-2 for the register circuits 16-3 are identical to one another and each may include a "FLIP-FLOP" circuit FF and an "AND" circuit serially connected to each other as shown in FIG. 7. The output signal from the level comparator 36-3 is supplied to one input of all the "AND" circuits 16-1$a$, $b$, $c$, ... also all the "AND" circuits 16-1$a$, $b$, $c$, ... have their other inputs connected to the outputs D$a$, D$b$, D$c$, ... of the decoder 32-2 respectively. In the example illustrated the frequency $f_a$ is being applied to the conductors 72 and 30 as a result of an output signal being produced at the output D$a$ of the decoder 32-2. This output signal is also applied to the "other" input to the "AND" circuit 16-1$a$ while no signal is applied to the other inputs to the remaining "AND" circuits 16-1$b$, $c$, ... Therefore only the "AND" circuit 16-1$a$ produces an output to supply it to the "FLIP-FLOP" circuit 16-2$a$. When the driving circuit 16-2$a$ has fulfilled predetermined conditions it provides an output to supply it to the associated register circuit 16-3$a$. This results in that register circuit 16-3$a$ counting "ONE" or a predetermined increment of power integrated by the associated watt-hour meter or consumed by the associated customer. If the contacts 60$a$ are in the open position, the "AND" circuit 16-1$a$ is disabled to produce an output with the result that the register circuit 16-3$a$ does not perform the counting operation.

Then for the remaining frequencies $f_b, f_c, \ldots$ the process as above described is successively repeated sensing the status of the associated contacts 60$b$, $c$, ... whereby the register circuits 16-3$b$, $c$, ... count "ONE" whenever it is necessary to do so.

As compared with the conventional type of automatic gauge inspection systems utilizing the distribution line, the invention has the following advantages:

a. Since the blocking coil 52 has been previously connected in each of the watt-hour meters for customers the neutral conductor exhibits a fairly high impedance to ground in response to high frequency noise such as lightning bolts. Therefore upon the occurrence of lightning bolts, for example, high voltages have been applied to watt-hour meters and loads on the side of the customers leading to a fear that they will fail or be broken. In contrast, the invention completely eliminates such a fear because the blocking coils are not required while the neutral conductor is directly grounded.

b. As above described, the forced grounding at the point A (see FIG. 2) on the customer side has caused the conventional systems to be disabled to read the watt-hour meter grounded at the point A. However such forced grounding does not affect the measurement effected by the invention.

c. The invention eliminates the necessity of using the blocking coils previously required to be disposed one for each customer.

d. The conventional systems have operatively connected to the watt-hour meter the series resonant circuit including one end required to be grounded. This has led to the series connection of the equivalent grounding resistance in the series resonant circuit which, in turn decreases the Q (that is equal to $1/wRC$) and therefore deteriorates the frequency separation. This deterioration of the frequency separation has been accompanied by a decrease in the number of watt-hour meters measurable by a single repeater unit. In comparison, the invention includes the measuring wire composed of the neutral conductor and transmission conductor across which the series resonant circuit is connected. This results in the circuit with a high Q and therefore an increase in the number of watt-hour meters connectable to the single repeater unit.

e. The measuring wire of the invention can be produced in a unitary structure by molding a core conductor and transmission conductor in a juxtaposed parallel relationship with the result that the wiring work becomes convenient.

Also as compared with the conventional automatic gauge inspection systems utilizing the pilot wire or pulse transmission the invention has the following advantages;

f. The invention permits the measuring wire to be branched at will which has been previously impossible.

g. The conventional systems have been required to connect the repeater unit to the individual watt-hour meters through a two core measuring wire. In the invention, however, the measuring wire includes the neutral conductor and the transmission conductor disposed in a juxtaposed, electrically insulated relationship in a electrically insulating sheath. Thus problems will be rarely encountered in wiring work.

FIG. 5, wherein like reference numerals designate the components identical or similar to those shown in FIG. 3, illustrates a modification of the invention improved in mechanical properties and facilitating wiring work. The arrangement illustrated is different from that shown in FIG. 3 in that the transmission conductor 72 is composed of a stranded conductor disposed in an separate, electrically insulating covering 74' and a narrow or constricted portion 78 of electrically insulating material connects the covering 74' to an electrically insulating covering 74 for a single solid conductor 30 serving as the neutral of the distribution line. For example, the stranded conductor 72 may be formed of seven strands having a diameter of 0.32 mm. The constricted portion 78 may have a length of 1 mm or less. If desired, the constructed portion 78 may resemble narrow portion of a bottle gourd.

Upon practicing the invention caution should be paid to the structural problems of the compound wire such as shown in FIG. 5. Firstly, one must take into account of the breaking load or tensile strength of the wire because with the wire laid on poles the same load is applied with a longitudinal tension. The arrangement as shown in FIG. 5 is adapted to bear entirely such a tension, upon the single solid conductor 30 while the stranded conductor 72 is prevented from being applied with the tension.

Secondly the bending and torsional strengths are of importance. In view of the stand point of wiring work it is difficult to lay the compound wire on poles while it is maintained untwisted. This is because the laid transmission conductor increases in the actual length greater than the power conductor or the neutral conductor juxtaposed with the same. For this reason, the transmission conductor has been formed of a stranded conductor in order to permit it to be somewhat lengthened.

Finally, the compound wire is desired to be readily separated into the neutral or solid conductor 30 and the transmission conductor 72 to suit the requirements for particular laying work. Upon separating the wire into the two conductors either or both of the conductors should be prevented from being at least partly bare as a result of the covering or coverings thereof being broken. The constricted insulation 78 is effective for separating the wire into the two conductors without breaking their coverings.

It has been found that the compound wire such as shown in FIG. 5 is successfully usable with the automatic gauge inspection system as above described.

Upon identifying the respective customers and separately inspecting the cutomers' integration meters by assigning different frequencies $f_a, f_b, \ldots$ thereto respectively, the single compound wire should be, as a matter of cource, limited in the number of the customers capable of being connected in branched circuit relationship therewith. Therefore a situation may occur where all the requisite customers cannot be connected to the single repeater unit. In that event the solid conductor 30 can have another stranded conductor 72a identical in construction to the stranded conductor 72 and operatively associated therewith in the same manner as described above in conjunction with FIG. 5, thereby forming a three-core wire 70 as shown in FIG. 6. Then the solid and stranded conductors 30 and 72 are used to connect one group of customers 86 to a repeater unit (not shown in FIG. 6) while the same solid conductor 30 cooperates with other stranded conductor 72a to connect another group of customers 82 to another repeater unit (not shown). In other words either of the stranded conductors 72 and 72a pairs with the common solid conductor 30 to form a pair of signal transmission lines. The single solid conductor 30 serves as a common transmission conductor through which both the system power and a plurality of sets of measured power signals flow.

Thus it will be appreciated that one group of customers connected to a repeater unit can consumed power measured independently of another group of customers connected to a separate repeater unit so that the use of a compound wire 70, including a pair of stranded conductors 72 and 72a such as shown in FIG. 5, can double the number of customers measurable in consumed power as compared with the use of a compound wire including a single transmission conductor, for example, the wire as shown in FIG. 3.

While the invention has been illustrated and described in conjunction with a few preferred embodiments thereof it is to be understood that numerous changes and modifications may be resorted to without departing from the spirit and scope of the invention. For example, the neutral conductor may be replaced by a grounding conductor of the distribution line. Also the pair of signal transmission conductors are not necessarily required to be enclosed together with a solid conductor by an insulating covering, they are required only to be electrically paired with the neutral conductor respectively. Further if desired, the number of customers measurable in consumed power may increase by disposing three or more signal transmission conductors side by side with a single neutral conductor. Further the existing distribution line may have one, or two or even more than two of signal transmission conductors operatively associated with the neutral conductor thereof to form a measuring line or lines for automatic gauge inspection.

In addition to the detection of a change in impedance of a series resonant circuit as above described, the invention is equally applicable to the case where alternating current signals are produced by customers' watt-hour meters and then delivered to the signal transmission conductor with the associated neutral conductor used as a return conductor. Furthermore the invention is equally applicable to systems for automatically inspecting integration meters for use with water and gas utilities.

What is claimed is:

1. In combination: a power distribution system supplying power during use and including a neutral conductor; and an automatic meter reading system comprising, a plurality of metering devices recording incrementally a measurable physical quantity, each metering device having indicating means receptive of sampling signals applied thereto for indicating information having a content corresponding to the incremental variations of said physical quantity, sampling means for developing sampling signals and for sampling the information of each metering device individually, said sampling means having memory means for storing said information of each metering device, means defining a sampling signal transmission circuit isolated from the supplied power comprising said neutral conductor and a signal transmission conductor extending longitudinally in a side-by-side relationship with said neutral conductor both connecting each of said metering devices to said sampling means and means insulating said conductors including insulation insulating them electrically from each other, whereby said neutral conductor simultaneously serves as a power conductor and a signal conductor.

2. The combination according to claim 1, wherein said means insulating joins said neutral conductor and said signal transmission conductor in a unitary structure.

3. The combination according to claim 1, wherein said signal transmission conductor is a stranded conductor.

4. The combination according to claim 1, including another signal transmission conductor juxtaposed in an electrically insulated relationship with said neutral conductor, whereby the signal transmission conductors define a plurality of independent signal transmission lines.

5. The combination according to claim 1, wherein said metering devices are electric power meters each comprising a tuned circuit having a predetermined individual frequency, different from the frequency of the other metering devices, said sampling means having means to generate said sampling signal at different frequencies corresponding to the individual frequencies of the metering devices.

* * * * *